(12) United States Patent
Yoon et al.

(10) Patent No.: US 8,784,751 B2
(45) Date of Patent: Jul. 22, 2014

(54) THERMOWELL COMPOUND APPARATUS OF HIGH SHELL FOR RESIDUE HYDROGEN DESULFURIZATION

(75) Inventors: Hyung No Yoon, Ulsan (KR); Sang Mo Lee, Ulsan (KR); Jin Gyu Kim, Ulsan (KR); Mock Huh, Ulsan (KR); Choo Jei Kim, Ulsan (KR)

(73) Assignees: SK Innovation Co., Inc., Seoul (KR); SK Energy Co., Ltd., Seoul (KR)

( * ) Notice: Subject to any disclaimer, the term of this patent is extended or adjusted under 35 U.S.C. 154(b) by 738 days.

(21) Appl. No.: 12/452,724

(22) PCT Filed: Aug. 6, 2008

(86) PCT No.: PCT/KR2008/004564
§ 371 (c)(1),
(2), (4) Date: Jan. 18, 2010

(87) PCT Pub. No.: WO2009/020345
PCT Pub. Date: Feb. 12, 2009

(65) Prior Publication Data
US 2010/0135862 A1    Jun. 3, 2010

(30) Foreign Application Priority Data
Aug. 6, 2007  (KR) .................. 10-2007-0078742

(51) Int. Cl.
*B01L 99/00*  (2010.01)
(52) U.S. Cl.
USPC ........................... 422/544; 422/545; 422/566
(58) Field of Classification Search
USPC ................ 422/544, 545, 565, 566; 73/861.01
See application file for complete search history.

(56) References Cited

U.S. PATENT DOCUMENTS

| | | | |
|---|---|---|---|
| 5,632,556 A * | 5/1997 | Sivyer | 374/138 |
| 5,707,152 A | 1/1998 | Krywitsky | |
| 6,769,483 B2 | 8/2004 | de Rouffignac et al. | |
| 7,194,920 B2 * | 3/2007 | Welker | 73/861.65 |
| 7,270,742 B2 | 9/2007 | Karas et al. | |
| 2006/0207344 A1 * | 9/2006 | Welker | 73/861.65 |

FOREIGN PATENT DOCUMENTS

| | | |
|---|---|---|
| JP | 4326029 A | 11/1992 |
| JP | 05142054 | 6/1993 |
| JP | 06244464 | 9/1994 |
| JP | 08201185 | 8/1996 |
| JP | 09104878 | 4/1997 |

(Continued)

OTHER PUBLICATIONS

International Search Report of PCT/KR2008/004564 dated Feb. 4, 2009.

(Continued)

*Primary Examiner* — Jill Warden
*Assistant Examiner* — Dwayne K Handy
(74) *Attorney, Agent, or Firm* — Abelman, Frayne & Schwab

(57) ABSTRACT

The present invention relates to a thermowell blocking apparatus for a high-pressure reactor used in a desulfurization process, which can rapidly prevent noxious high-temperature and high-pressure gases from leaking out of a high-pressure reactor when the noxious high-temperature and high-pressure gases leak from the high-pressure reactor due to unexpected damage occurring to a thermowell used for measuring a reaction temperature of a catalyst. The thermowell blocking apparatus can prevent the economic losses caused by the stoppage of the desulfurization process, and can reduce consequential damages to human life, the environment, and the like.

4 Claims, 3 Drawing Sheets

(56) References Cited

FOREIGN PATENT DOCUMENTS

| | | |
|---|---|---|
| JP | 10214632 | 8/1998 |
| JP | 10221178 | 8/1998 |
| JP | 10260085 | 9/1998 |

OTHER PUBLICATIONS

Office Action from the Japanese Patent Office for Japanese Patent Application No. 2010-519861 dated Jan. 29, 2013. (English Summary).

* cited by examiner

THERMOWELL COMPOUND APPARATUS OF HIGH SHELL FOR RESIDUE HYDROGEN DESULFURIZATION

TECHNICAL FIELD

The present invention relates to a thermowell blocking apparatus for a high-pressure reactor used in a desulfurization process, and, more particularly, to a thermowell blocking apparatus for a high-pressure reactor used in a desulfurization process, which can prevent noxious high-temperature and high-pressure gases from leaking from a high-pressure reactor without doing harm to human life nor the environment and stopping a desulfurization process when the noxious high-temperature and high-pressure gases leak from the high-pressure reactor due to the unexpected damages to a thermowell for measuring a reaction temperature of a catalyst.

BACKGROUND ART

Generally, heavy oil, including diesel oil, natural gasoline, straight-run gasoline and cracked gasoline produced in the petroleum industry, contains various sulfur compounds.

These sulfur compounds cause serious pollution of heavy oil, and heavy oil containing these sulfur compounds is discharges noxious and corrosive sulfur oxides when it burns.

Desulfurization is a process of producing low-sulfur petrochemicals by removing the sulfur compounds having the above problems from heavy oil. In the desulfurization process, the sulfur compounds are removed from heavy oil using a high-pressure reactor.

That is, in the desulfurization process, the high-pressure reactor is filled with a catalyst for accelerating a desulfurization reaction, and then the sulfur compounds contained in heavy oil are removed using the catalyst, thereby producing low-sulfur petrochemicals.

Meanwhile, in this desulfurization process, since an exothermic reaction is conducted in the high-pressure reactor, reaction temperature becomes high. This high reaction temperature influences desulfurization conditions, catalyst, and the like, and thus it is very important to accurately measure this reaction temperature.

In order to accurately measure the reaction temperature, the high-pressure reactor used in the desulfurization process is provided with a thermowell.

This thermowell is welded at the front end of a protection tube passing through the body of the high-pressure reactor, so as to be immersed in the catalyst charged in the high-pressure reactor. A temperature sensor is inserted into the thermowell and protection tube to measure the actual temperature of the catalyst.

Accordingly, the temperature of the catalyst measured by the temperature sensor can be monitored in real time in a process control room through a temperature transmission unit.

However, such a conventional thermowell is problematic in that it is easily influenced by slight movement of the catalyst in the desulfurization process, and thus a portion in which the protection tube is welded thereto becomes easily damaged, and in that, when noxious gases leak out through the damaged portion thereof, the desulfurization process must be instantly stopped.

The high-pressure reactor is operated at a high pressure of about 160 $kg/cm^2$ and a high temperature of about 440° C., and includes hydrogen sulfide ($H_2S$) and ammonia ($NH_3$) in concentrations of 1,000 ppm therein. When the noxious high-temperature and high-pressure gases leak out through the damaged portion of the thermowell, there is problematic in that human life and the environment are seriously damaged.

DISCLOSURE

Technical Problem

Accordingly, the present invention has been made keeping in mind the above problems occurring in the prior art, and an object of the present invention is to provide a thermowell blocking apparatus for a high-pressure reactor used a desulfurization process, by which the leakage of noxious high-temperature and high-pressure gases can be rapidly prevented when the welded portion of a thermowell and a protection tube becomes damaged by catalyst movement during the desulfurization process, so that damage caused by the leakage of the noxious gases can be minimized and the stability of the thermowell can be improved.

Another object of the present invention is to provide a thermowell blocking apparatus for a high-pressure reactor used in a desulfurization process, which can prevent noxious high-temperature and high-pressure gases from leaking out when the welded portion of a thermowell and a protection tube are damaged by the movement of a catalyst.

A further object of the present invention is to provide a thermowell blocking apparatus for a high-pressure reactor used in a desulfurization process, having excellent blocking performance, which can rapidly block the leakage path of noxious high-temperature and high-pressure gases for a long time by doubly blocking the thermowell.

A still further object of the present invention is to provide a thermowell blocking apparatus for a high-pressure reactor used in a desulfurization process, which can prevent economic losses caused by the stoppage of the desulfurization process, and which can reduce consequential damages to human life, the environment, and the like.

Technical Solution

In order to accomplish the above objects, the present invention provides a thermowell blocking apparatus, including: a protection tube passing through a high-pressure reactor; a thermowell provided at the front end of the protection tube to be immersed in a catalyst charged in the high-pressure reactor; a temperature sensor provided in the protection tube in a state in which it is connected to the thermowell so as to measure the reaction temperature of the catalyst; and leakage prevention means provided at the rear end of the protection tube exposed to the outside of the high-pressure reactor to block a leakage path of noxious gases.

Therefore, even when the connection portion of the protection tube and the thermowell is damaged, the leakage path of noxious high-temperature and high-pressure gases is blocked using the leakage prevention means, thereby preventing the stoppage of the desulfurization process due to the leakage of the noxious gases and reducing the damages to human life, the environment, and the like.

Advantageous Effects

According to the present invention, when the connection portion of the protection tube and the thermowell is damaged in the chemical reaction of a catalyst, the leakage path of noxious gases is blocked by the leakage prevention means, thereby preventing the noxious gases from leaking out.

Further, the protection tube having the leakage path is doubly blocked using an extended protection tube and an auxiliary compression blocking unit, so that the leakage path of noxious high-temperature and high-pressure gases can be blocked for a long time, thereby providing a thermowell blocking apparatus having excellent blocking performance.

Furthermore, after the leakage prevention means is provided at the rear end of the protection tube, the protective tube is completely sealed by welding the protection tube to the thermowell, thereby preventing the unexpected leakage of the noxious gases.

Accordingly, the thermowell blocking apparatus according to the present invention can prevent economic losses caused by the stoppage of the desulfurization process, and which can reduce consequential damages to human life, the environment, and the like.

DESCRIPTION OF THE ELEMENTS IN THE DRAWINGS

Figure 1:
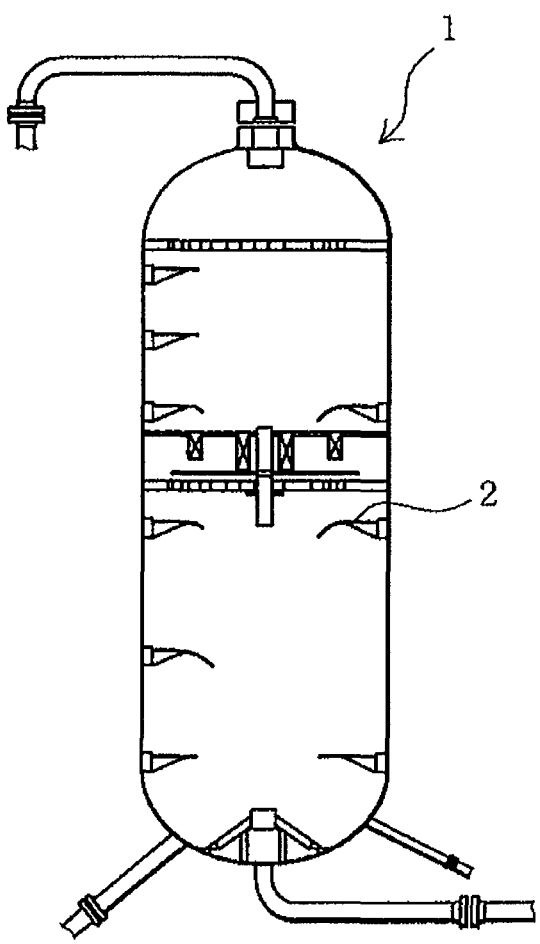
FIG. 1 is a schematic view showing a high-pressure reactor for a desulfurization process.

1: high-pressure reactor
2: temperature measuring unit
3: leakage prevention means
10: body
20: protection tube
21: front end
22: rear end
30: thermowell
31: temperature sensor
41, 42: leakage path
50: compression blocking unit
52: extended protection tube
53: auxiliary compression blocking unit
60: sealing cap

MODE FOR INVENTION

Hereinafter, preferred embodiments of the present invention will be described in detail with reference to the attached drawings.

FIG. 1 is a schematic view showing a high-pressure reactor for a desulfurization process. As shown in FIG. 1, the high-pressure reactor is filled with a catalyst and is provided with a plurality of temperature measuring units such that it can be used in a desulfurization process for removing sulfur compounds from heavy oil.

Figure 2:
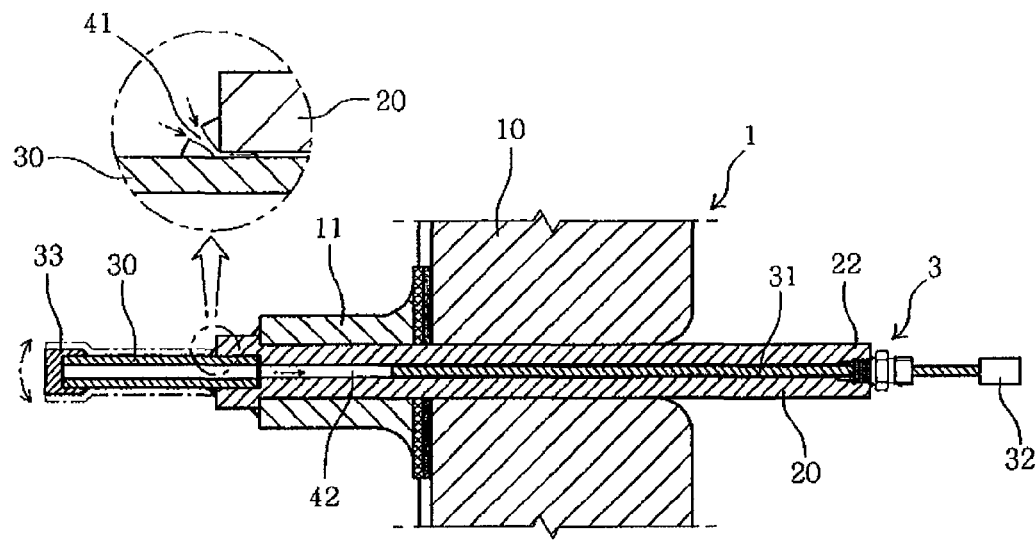
FIG. 2 is a partially enlarged sectional view showing a state in which a thermowell is provided in the high-pressure reactor according to the present invention.

FIG. 2 is a partially enlarged sectional view showing a state in which a thermowell is provided in the high-pressure reactor according to the present invention. As shown in FIG. 2, a protection tube is provided in the high-pressure reactor such that the protection tube passes through the body of the high-pressure reactor, a thermowell is provided at the front end of the protection tube, a temperature sensor for measuring a reaction temperature of a catalyst is provided in the protection tube, and leakage prevention means for blocking a leakage path of noxious high-temperature and high-pressure gases is provided at the rear end of the protection tube.

Figure 3:
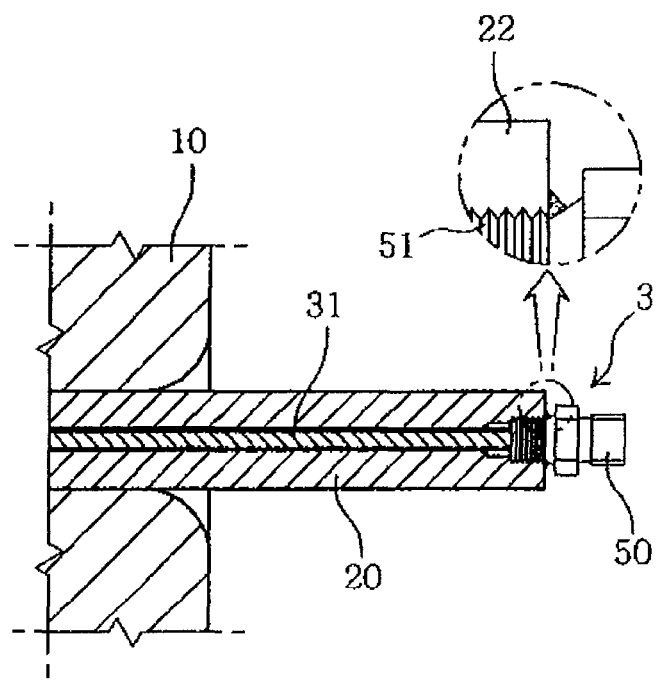
FIG. 3 is a partially enlarged sectional view showing the blocking state of a thermowell according to an embodiment of the present invention.

FIG. 3 is a partially enlarged sectional view showing the blocking state of a thermowell according to an embodiment of the present invention. As shown in FIG. 3, a compression blocking unit is provided at the rear end of the protection tube to block the leakage path of noxious gases.

Figure 4:
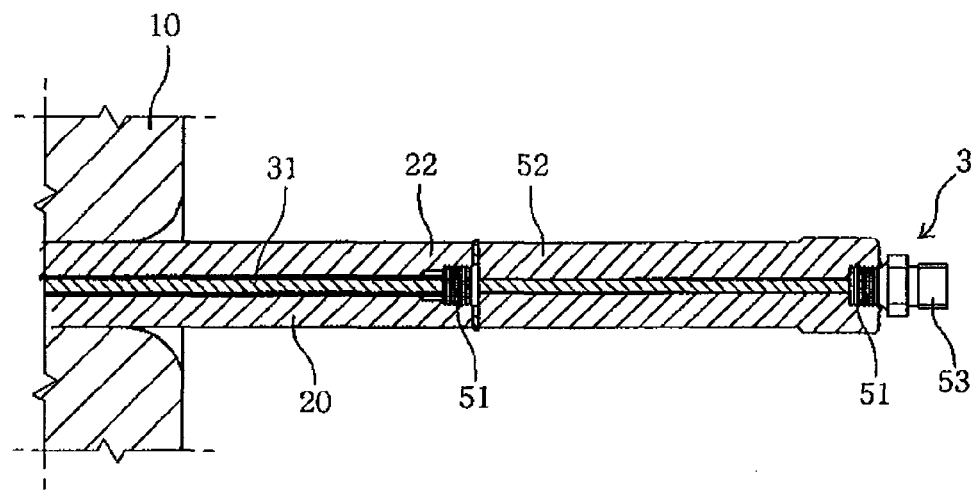
FIG. 4 is a partially enlarged sectional view showing the blocking state of a thermowell according to another embodiment of the present invention.

FIG. 4 is a partially enlarged sectional view showing the blocking state of a thermowell according to another embodiment of the present invention. As shown in FIG. 4, an extended protection tube is provided at the rear end of the protection tube, and an auxiliary compression blocking unit is provided at the rear end of the extended protection tube.

Figure 5:
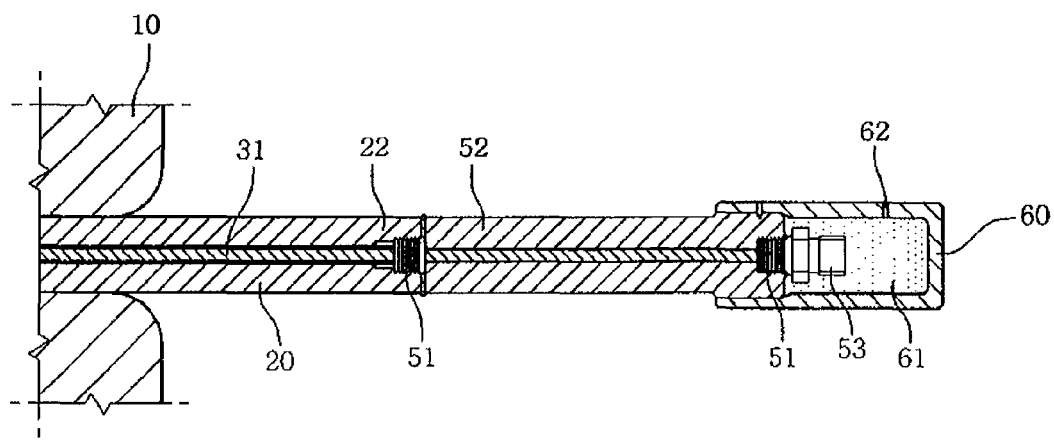
FIG. 5 is a partially enlarged sectional view showing a sealing cap according to the present invention.

FIG. 5 is a partially enlarged sectional view showing a sealing cap according to the present invention. As shown in FIG. 5, the auxiliary compression blocking unit is covered with a sealing cap, and the sealing cap is filled with a sealing agent.

That is, as shown in FIGS. 1 to 2, the thermowell blocking apparatus of the present invention is configured to prevent noxious high-temperature and high-pressure gases from leaking out from the high-pressure reactor 1 at the time of the unexpected damage of the thermowell used in a temperature measuring unit 2 for measuring a reaction temperature of a catalyst charged in the high-pressure reactor 1 in order to desulfurize heavy oil.

The protection tube passes through the body 10 of the high-pressure reactor 1 such that the thermowell 30 can be provided in the high-pressure reactor 1, and, preferably, the protection tube may be extended to a distance of about 130 mm from the circumferential surface of the high-pressure reactor 1.

More preferably, the protection tube 20 may be provided using a boss 11 in a state in which the boss 11 is adhered to the inner surface of the body 10 of the high-pressure reactor 1 to prevent the detachment of the protection tube 20.

That is, although the protection tube 20 is provided to pass through the body 10 of the high-pressure reactor 1, the boss 11 is adhered to the inner surface of the body 10 of the high-pressure reactor 1 to cover the front end of the protection tube 20, thus preventing the detachment of the protection tube 20. Further, the protection tube 20 is extended to a distance of about 130 mm from the circumferential surface of the high-pressure reactor 1 in order to easily provide a temperature sensor 31 described below.

The thermowell 30 is provided at the front end 21 of the protection tube 20 to be immersed in a catalyst charged in the high-pressure reactor 1. For this reason, the temperature sensor 31 can actually measure the reaction temperature of the catalyst.

Preferably, the thermowell 30 is provided by inserting it into the front end 21 of the protection tube 20 and then welding them together to prevent noxious gases generated by a chemical reaction of a catalyst charged in the high-pressure reactor from leaking out.

This thermowell 30 is connected with a temperature sensor 31. This temperature sensor is provided in the protection tube 20, and actually measures the catalyst reaction temperature transmitted through the thermowell 30. The measured catalyst reaction temperature is transmitted to a process control room through a temperature transmission unit, and is then monitored in real time in the process control room.

The front portion of the thermowell 30, which is immersed in a catalyst, is covered with a cap 33 to protect the thermowell 30.

Meanwhile, the leakage prevention means 3 according to the present invention is provided at the front end 21 of the protection tube 20 exposed to the outside of the high-pressure reactor 1, and serves to block a leakage path 41, 42 of noxious gases generated by a chemical reaction of a catalyst when the portion at which the thermowell 30 is connected with the protection tube 20, that is, the welded portion becomes damaged by the movement of the catalyst.

The leakage path 41, 42 includes the welded portion 41 of the thermowell 30 which damaged by the movement of the catalyst and inner passage 42 of the protection tube 20. The noxious gases leaking through the leakage path 41, 42 finally leak from the high-pressure reactor 1, thus causing damages to human life, the environment, and the like.

The high-pressure reactor 1 used in the desulfurization process is operated at a high pressure of about 160 kg/cm$^2$ and a high temperature of about 440° C., and includes hydrogen sulfide ($H_2S$) and ammonia ($NH_3$) in concentrations of 1,000 ppm therein. When these noxious high-temperature and high-pressure gases leak out through the leakage path 41, 42, serious damages to human life, the environment, and the like ensue.

Therefore, as shown in FIG. 3, an embodiment of the leakage prevention means 3, serving to prevent the noxious gases leaking through the leakage path 41, 42 and thus causing serious damages from leaking out, is configured such that a compression blocking unit 50 is provided at the rear end 22 of the protection tube 20.

That is, the compression blocking unit 50 provided at the rear end 22 of the protection tube 20 blocks the leakage path 41, 42, thus preventing the noxious gases from leaking out through this leakage path 41, 42. It is preferred that the leakage path 41, 42 be completely blocked by providing the compression blocking unit 50 at the rear end 22 of the protection tube 20 and then welding them together.

In this case, the compression blocking unit 50 provided at the rear end 22 of the protection tube 20 may be provided through an interference fitting method. More preferably, in order to rapidly provide the compression blocking unit, the compression blocking unit 50 may be provided through a screwing method using screw threads 51 formed on the inner surface of the rear end of the protection tube 20 and the circumferential surface of the compression blocking unit 50, thus rapidly blocking the leakage path 41, 42.

As shown in FIG. 4, another embodiment of the leakage prevention means 3 is configured such that an extended protection tube 52 is provided at the rear end 22 of the protection tube 20, and an auxiliary compression blocking unit 53 are provided at the rear end of the extended protection tube 52, thus doubly blocking the leakage of noxious gasses passing through the leakage path 41, 42.

In this case, owing to the extended protection tube 52, the length of the protection tube 20 exposed to the outside of the high-pressure reactor 1 is increased, so that the leakage path 41, 42, through which noxious gases pass, is substantially extended, with the result that the leakage of noxious gases can be delayed.

Further, since the leakage pressure coinciding with the leakage of noxious gases is blocked for a long time using the extended protection tube 52, the time necessary for solving the leakage of the noxious gases can be secured.

The extended protection tube 52 playing the above role is provided at the rear end thereof with an auxiliary compression blocking unit 53 to block the leakage path 41, 42, so that, finally, the leakage path 41, 42 is doubly blocked, thereby securing stability and preventing damages from occurring to human life and the environment.

The extended protection tube 52 and the auxiliary compression blocking unit 53 may be provided through an interference fitting method, respectively. However, it is advantageous that they be provided through a screwing method in order to easily and rapidly provide them, as described above.

Moreover, it is preferred that the extended protection tube 52 provided at the rear end 22 of the protection tube 20 and the auxiliary compression blocking unit 53 provided at the rear end of the extended protection tube 52 be completely blocked by providing the extended protection tube 52 and the auxiliary compression blocking unit 53 and then welding them together.

Meanwhile, the compression blocking unit 50, which is provided at the rear end 22 of the protection tube 20 and finally blocks the leakage path 41, 42 and thus can secure the safety of the space in which the high-pressure reactor 1 is provided, and the auxiliary compression blocking unit 53, which is provided at the rear end of the extended protection tube 52, are covered with a sealing cap 60 having a sealing space 61 and thus isolated.

Here, it is shown and described that the sealing cap 60 is provided to cover the auxiliary compression blocking unit 53 provided at the rear end of the extended protection tube 52.

That is, as shown in FIG. 5, since the sealing cap 60 is provided at the rear end of the extended protection tube 52 to cover the auxiliary compression blocking unit 53, even when noxious gases unexpectedly leak from the auxiliary compression blocking unit 53, the noxious gases do not leak out because the auxiliary compression blocking unit 53 is isolated from the outside by the sealing cap 60.

More preferably, a sealing hole 62 is formed in the upper portion of the sealing cap 60, and then the sealing hole 62 communicates with the sealing space 61, and thus the sealing space 61 and the auxiliary compression blocking unit 53 are completely sealed with a sealing agent supplied through the sealing hole 62.

When the sealing agent is completely charged into the sealing space 61, it is preferred that the unexpected leakage of noxious gases be prevented by closing the sealing hole 62.

As described above, according to the thermowell blocking apparatus of the present invention, the leakage of the noxious gases generated by a process of removing sulfur compounds from heavy oil can be prevented, and additional damages can be prevented by rapidly blocking the thermowell at the time of the leakage of noxious gases.

The invention claimed is:

1. A thermowell blocking apparatus for a high-pressure reactor used in a desulfurization process, comprising:
a protection tube passing through a high-pressure reactor;
a thermowell provided at a front end of the protection tube to be immersed in a catalyst charged
in the high-pressure reactor;
a temperature sensor provided in the protection tube to measure a reaction temperature of the catalyst, the temperature sensor being connected with the thermowell;
leakage prevention means provided at the protection tube exposed to the outside of the high pressure reactor to block a leakage path of noxious gases; and
a boss adhered to an inner surface of the high-pressure reactor to include the protection tube therein;
wherein the leakage prevention means includes a compression blocking unit which is provided at a rear end of the protection tube and blocks a leakage path of noxious gases, and the leakage path of noxious gases is blocked by providing the leakage prevention means at the protection tube and then welding them together, wherein the rear end of the protection tube and the compression blocking unit are provided with screw threads, respectively, to rapidly block the leakage path and are then welded.

2. A thermowell blocking apparatus for a high-pressure reactor used in a desulfurization process, comprising:
   a protection tube passing through a high-pressure reactor;
   a thermowell provided at a front end of the protection tube to be immersed in a catalyst charged in the high-pressure reactor;
   a temperature sensor provided in the protection tube to measure a reaction temperature of the catalyst, the temperature sensor being connected with the thermowell;
   leakage prevention means provided at the protection tube exposed to the outside of the high-pressure reactor to block a leakage path of noxious gases; and
   a boss adhered to an inner surface of the high-pressure reactor to include the protection tube therein;
   wherein the leakage prevention means comprises:
   an extended protection tube provided at a rear end of the protection tube; and
   an auxiliary compression blocking unit which is provided at a rear end of the extended protection tube and blocks a leakage path of noxious gases,
   wherein the rear end of the extended protection and the auxiliary compression blocking unit are provided with screw threads, respectively, to rapidly block the leakage path and then welded.

3. The thermowell blocking apparatus according to claim 1, wherein the compression blocking unit is covered with a sealing cap having a sealing space and thus isolated, and the sealing space is charged with a sealing agent.

4. The thermowell blocking apparatus according to claim 2, wherein the auxiliary compression blocking unit is covered with a sealing cap having a sealing space and thus isolated, and the sealing space is charged with a sealing agent.

* * * * *